Oct. 22, 1963 L. G. LAKIN 3,107,642
IMPACT CUSHIONING DEVICE
Filed Sept. 4, 1962
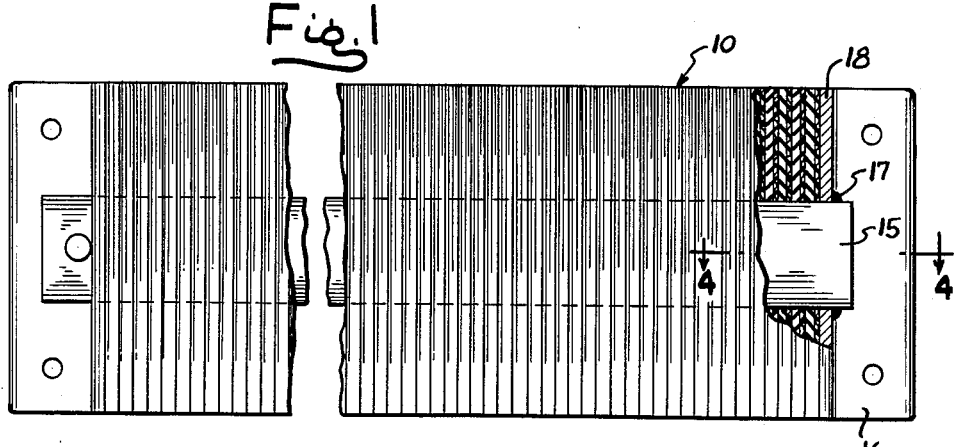
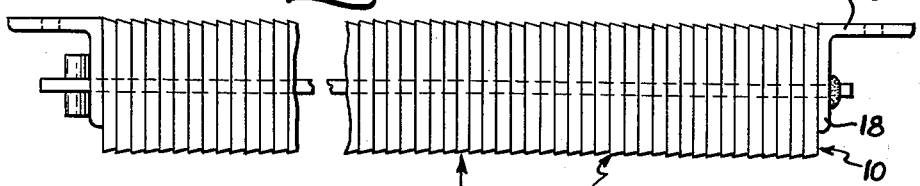
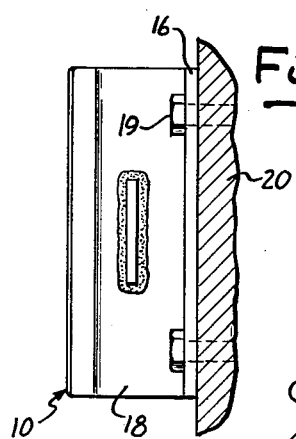
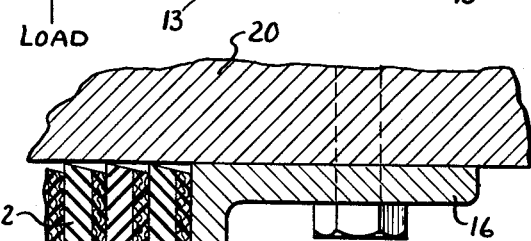
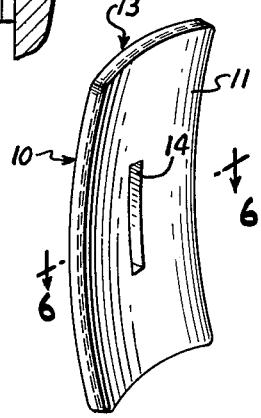
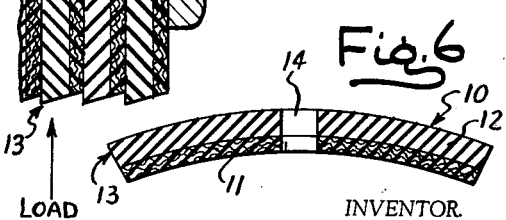
INVENTOR.
LEWIS G. LAKIN
BY
Gary, Desmond & Parker
ATTYS.

United States Patent Office 3,107,642
Patented Oct. 22, 1963

3,107,642
IMPACT CUSHIONING DEVICE
Lewis G. Lakin, Chicago, Ill., assignor to A. Lakin & Sons, Inc., Chicago, Ill., a corporation of Illinois
Filed Sept. 4, 1962, Ser. No. 221,153
3 Claims. (Cl. 114—219)

This invention relates to improvements in impact cushioning devices sometimes known as dock bumpers.

More particularly, the present invention relates to improvements in impact cushioning devices adapted for the protection on the one hand of docks, and on the other hand of vehicles or craft which come into abutment with the former. These devices are conventionally mounted on the edges of loading docks to provide enhanced protection for both the docks and the trucks or the like which are being loaded or unloaded at the docks.

It has heretofore been known to form impact cushioning devices or bumpers of the class aforesaid in units composed of a plurality of strips of rubber or fabric-reinforced rubber material, and to laminate and compress a plurality of such strips and dispose them in a holder fixture between rigid metal end plates with the aid of one or more rods or bars, extending through apertures in the thickness of the strips, to form a unitary bumper assembly. One or more of said assemblies or dock bumpers can be secured to and aligned on the edge of the loading dock to provide impact cushioning for the vehicle being loaded and unloaded at said dock.

It is an object of the present invention to provide impact cushioning devices of the class aforesaid formed of fabric-reinforced resilient rubber compositions, and which may also be suitably derived from tire treads, cut and arranged in a novel manner to provide enhanced cushioning and thus greater protection for both the dock and the body brought into contact therewith.

More specifically, in accordance with the present invention, I provide an impact cushioning device or dock bumper composed of fabric-reinforced rubber material strips wherein the fabric reinforcement is disposed and concentrated adjacent one face of each of the component strips and occupies less than one-half of the thickness of the strip.

A further characterizing feature of the present invention resides in forming the edges of the component strips, which are to provide the impact face of the assembly, with a bevel whereby the impact face has an undulating character or saw-tooth-like formation whereby to provide a gradual and enhanced cushioning effect.

A further characterizing feature of the present invention is to provide an impact cushioning device or dock bumper composed of a plurality of tire-carcass derived strips of fibrous fabric-reinforced rubber material, of generally rectangular shape, wherein the fabric reinforcement is essentially disposed adjacent one face of each of the strips and in less than one-half the thickness thereof; and wherein one of the edges of each of such strips which will form the load-bearing face of the assembly is beveled in a direction extending inwardly toward the fabric reinforced thickness portion, leaving projecting edge portions essentially free of rubber reinforcement, the resulting inclined projecting edge portions, wherein the outermost edges are free of fabric reinforcement, providing a novel and gradual enhanced impact cushioning area.

Other objects and advantages of the present invention, its details of construction, arrangement of parts and economies and advantages thereof will be apparent from a consideration of the following specification and accompanying drawings wherein:

FIG. 1 is a front elevational view, with parts broken away, of a bumper assembly formed in accordance with the present invention; and FIG. 2 is a plan view thereof.

FIG. 3 is an end view of the assembly of FIGS. 1 and 2 with a fragmentary showing of a dock to which the unit is attached.

FIG. 4 is an enlarged fragmentary view on the line 4—4 of FIG. 1.

FIG. 5 is a perspective view of a fabric-reinforced strip of rubber material derived from a tire carcass such as may be employed in forming the assembly of the present invention.

FIG. 6 is a section on the line 6—6 of FIG. 5.

Referring to the drawings, the reference numeral 10 generally indicates a strip of fabric-reinforced rubber material such as may be suitably cut from the tread portion of a tire carcass or casing. For the purpose of the present invention, the section or strip 10 is generally rectangular in character and is cut so that as shown in FIG. 6 the fabric reinforcement 11 is disposed adjacent one face of said strip and within less than one-half of the thickness thereof, leaving a thickness 12 which is free of fabric reinforcement. The fabric reinforcement 11 can be woven or weftless fabric of cotton or a synthetic fiber such as rayon, nylon or the like, or mixtures.

As a further characterizing feature of the present invention, the section 10 is cut so that at least one or more of its side edges is beveled as at 13 in a direction inwardly from the thickness 12 to the fabric reinforcement 11, with the result that the area of the face of the strip 10 closest to the fabric 11 is narrower than the opposed face defining the thickness 12.

The strip 10 is further formed with an axially disposed elongated aperture 14 whereby a plurality of said strips 10 may be aligned and assembled on the bar 15. It will be understood that although one slot 14 in bar 15 is shown, in lieu thereof one or more apertures of other shape may be employed and one or more elongated bolts received in such apertures for assembly purposes.

In forming the unitary assembly shown in FIGS. 1 and 2, and as previously indicated, a plurality of strips 10 are assembled on the bar 15 and compressed thereon to form a laminate, and to flatten the arcuate shapes of the strips 11 when they are of such tire-carcass-derived character, and in any event to provide a laminate of enhanced strength and by aid of the reinforcing rod 15 of great resistance to bending. The strips 10 under compression and mounted on the rod 15 are then secured between an opposed pair of end plates 16, 16 formed with apertures receiving the outer ends of the rod 15. While these end plates and the strips 10 between them are held under compression, the rods 15 are welded to the plates 16 as at 17 to form a rigid assembly. It will be understood that in the alternative, in lieu of welding, the bar 15 may be a rod or bolt secured endwise outwardly of the plates 16. The pressure plates 16 may suitably be portions of angle brackets and thus each integral with a leg 18 formed with apertures whereby it may be bolted as at 19 to a supporting structure such as a dock 20. It will be understood that the assemblies as indicated in FIGS. 1 and 2 may be employed in groups, that is, they may be longitudinally aligned to cover as much of the width of the dock as may be necessary or desirable, and of course two or more units may be aligned transversely, that is, disposed one above the other.

As previously indicated, at least one of the edges of the strip 10 is beveled and when they are arranged on the bar 15 they are disposed thereon in such manner that at least one beveled edge 13 extends outermost and forms the load-receiving face as indicated by the arrows in FIGS. 2 and 4. Thus, the load or impact-receiving face of the assembly is of an undulating character with spaced edges or tooth-like portions 13 of the fabric-free strip thickness 12 projecting outermost, thus providing an enhanced cushioning effect which gradually takes up and relieves undue strains on both the dock and the body which is brought up into contact therewith.

Although I have shown and described the preferred embodiment of my invention it will be understood by those skilled in the art that changes may be made in the details thereof without departing from its scope as comprehended by the following claims.

I claim:

1. An impact cushioning device comprising a laminate of a plurality of strips of fabric-reinforced rubber material of generally rectangular shape, the fabric reinforcement being disposed adjacent one surface of each of said strips and within less than one-half the thickness thereof comprising its back, at least one edge of each of said strips being beveled in a direction extending inwardly towards said fabric-reinforced thickness back portion with its apex free of said reinforcement and defining a serrated impact face of said device.

2. An impact cushioning device comprising a laminate composed of a plurality of tire-carcass-derived resilient strips of fabric-reinforced rubber material of generally rectangular shape, the fabric reinforcement being disposed adjacent one surface of each of said strips and within less than one-half the thickness thereof comprising its back, at least one edge of each of said strips being beveled in a direction extending inwardly towards said fabric-reinforced thickness back portion with its apex free of said reinforcement and defining a serrated impact face of said device, said strips being formed with apertures and thereby aligned on rigid means extending therethrough in face-to-back relationship, and retained under compression thereon between end plate members.

3. An impact cushioning device adapted to be mounted on a dock or the like comprising a laminate of a plurality of strips of fabric-reinforced rubber material of generally rectangular shape and substantial thickness arranged in a stacked relationship, each of said strips including a fabric reinforcement disposed adjacent a planar face and extending to less than one half the thickness thereof and having at least one edge thereof formed beveled in a direction extending inwardly towards the fabric reinforced thickness defining the impact surface of said device, and further including a single rectangular shaped aperture disposed in a central portion thereof with the longitudinal dimension of said aperture aligned in the same direction as the longitudinal dimension of said strip, said device further comprising rectangular shaped rigid means substantially of the same dimension as said aperture and extending therethrough to maintain said strips in alignment with one another and means connected to said rigid means for maintaining the plurality of strips under compression.

References Cited in the file of this patent

UNITED STATES PATENTS

| | | |
|---|---|---|
| 1,981,182 | Lyons | Nov. 20, 1934 |
| 2,649,295 | Schuyler | Aug. 18, 1953 |
| 3,013,516 | Norman | Dec. 19, 1961 |
| 3,063,399 | Schuyler | Nov. 13, 1962 |
| 3,063,700 | Tallbot | Nov. 13, 1962 |

FOREIGN PATENTS

| | | |
|---|---|---|
| 478,154 | Great Britain | Jan. 13, 1938 |